United States Patent [19]

Walterick, Jr.

[11] Patent Number: 4,668,404

[45] Date of Patent: * May 26, 1987

[54] PROCESS FOR REDUCING COLOR CONTAMINATION OF INFLUENT WATER

[75] Inventor: Gerald C. Walterick, Jr., Levittown, Pa.

[73] Assignee: Betz Laboratories, Inc., Trevose, Pa.

[ * ] Notice: The portion of the term of this patent subsequent to Apr. 28, 2004 has been disclaimed.

[21] Appl. No.: 728,986

[22] Filed: Apr. 30, 1985

[51] Int. Cl.$^4$ .............................................. C02F 1/56
[52] U.S. Cl. ................................. 210/666; 210/694; 210/728; 210/736; 210/917
[58] Field of Search ............... 210/666, 694, 714, 725, 210/727, 728, 730, 735, 736, 908, 917

[56] References Cited

U.S. PATENT DOCUMENTS

| | | | |
|---|---|---|---|
| Re. 28,807 | 5/1976 | Panzer et al. | 210/736 |
| Re. 28,808 | 5/1976 | Panzer et al. | 210/736 |
| 3,252,899 | 5/1966 | Rice et al. | 210/666 |
| 3,288,770 | 11/1966 | Butler | 526/204 |
| 3,338,828 | 8/1967 | Clark | 210/730 |
| 3,423,312 | 1/1969 | Blaisdell et al. | 210/714 |
| 3,917,821 | 11/1975 | Manes | 424/125 |
| 4,043,904 | 8/1977 | Takeda et al. | 210/666 |
| 4,239,865 | 12/1980 | Tarao et al. | 210/688 |
| 4,274,968 | 6/1981 | Grutsch et al. | 210/666 |
| 4,320,011 | 3/1982 | Sato et al. | 210/694 |
| 4,537,683 | 8/1985 | Isacoff et al. | 210/667 |

FOREIGN PATENT DOCUMENTS 53-20656  2/1978  Japan .

OTHER PUBLICATIONS

Glasser et al., "Coagulation & Direct Filtration of Humic Substances with Polyethylenimines", *Env. Sci. & Tech.*, Mar. 1979, pp. 299–305.
Chem. Abs. 87:90394c (1977).
Chem. Abs. 89:117244m (1978).
Chem. Abs. 94:157877e (1981).
Chem. Abs. 89:117260p (1978)–see above Japanese Ref.
"The Mechanism of Flocculation Processes in the Presence of Humic Substances", Narkis et al, Journal AWWA, Feb. 1975, pp. 101–108.
"Chlorination of Organics in Drinking Water", Stevens et al, Journal AWWA, Nov. 1976, pp. 615–620.
"Measurement of Trihalomethane & Precursor Concentration Changes", Stevens et al, Journal AWWA, Oct. 1977, pp. 546–554.
"The Occurence of Organohalides in Chlorinated Drinking Waters", Bellar et al, Journal AWWA, Dec. 1974, pp. 703–706.
"The Use of Chloramine for Reduction of Trihalomethanes & Disinfection of Drinking Water", Brodtmann et al, Journal AWWA, Jan. 1979, pp. 40–42.
"Coagulation & Color Problems" Joint Report, Journal AWWA, May 1970, pp. 311–314.
"Removing Color & Chloroform Precursors from Low Turbidity Waters by Direct Filtration", Scheuch et al, Journal AWWA, Sep. 1981, pp. 497–502.
"Model Organic Compounds as Precursors of Chloroform Production in the Chlorination of Water Supplies", Baum et al, American Chemical Society Nat'l Meeting, Mar. 1978.

*Primary Examiner*—Peter Hruskoci
*Attorney, Agent, or Firm*—Alexander D. Ricci; Bruce E. Peacock; James D. Dee

[57] ABSTRACT

Methods and compositions for reducing organic color contamination in influent water are disclosed. The methods comprise adding to the influent water powdered activated carbon and a water soluble or water dispersible cationic polymer. The polymers are chosen from: (a) polyquaternary ammonium polymers formed from reaction of a secondary amine with an epichlorohydrin or epoxide (b) cross-linked polyquaternary ammonium polymers formed from reaction of a secondary amine, epichlorohydrin or epoxide, and a third reactant selected from the group consisting of ammonia, primary amines, alkylenediamines and polyamines and (c) substantially linear high molecular weight polyquaternary ammonium polymers of the type disclosed in U.S. Pat. No. 3,288,770, such as polydiallyldimethyl ammonium chloride. Compositions comprise a slurry comprising powdered activated carbon and at least one polymer chosen from the (a) (b) and (c) groupings and mixtures thereof.

6 Claims, No Drawings

PROCESS FOR REDUCING COLOR CONTAMINATION OF INFLUENT WATER

FIELD OF THE INVENTION

The present invention pertains to methods and compositions for reducing the color content of influent water for potable and/or industrial use.

BACKGROUND

Influent water treatment is needed to remove contaminants from raw water to make it suitable for potable or industrial uses. These contaminants may be either soluble or insoluble, with solubility dictating the procedure needed for proper removal.

Soluble components are usually removed or minimized via lime/soda softening, demineralization, etc. Insoluble components may be reduced or removed by settling or filtration.

Swamps and wetlands often introduce color contaminants into raw water sources. The problem is particularly acute after heavy rainfalls. Color in raw water causes various problems including objectionable taste, increased bacteria and algae growth, fouling of anion exchange resins, interference with coagulation, and stabilization of soluble iron and manganese.

Most color in raw water is colloidal in nature and results from organic material such as humic acids, lignins, tannins, fulvic acids, and other related compounds that are leached from leaves or other vegetation.

I have found that such color contamination can be effectively reduced by the use of a combination of powdered activated carbon (PAC) and a water soluble or water dispersible cationic polyelectrolyte.

PRIOR ART

Traditionally, chlorination or coagulation with inorganic salts has been used to reduce color content. Cationic polymers have also been used.

Chlorination is problematic in that chlorine reacts with the color contaminants and is thought to form members of the carcinogenic trihalomethane genus. As such, chlorination is disfavorably viewed as a safe means to reduce color content.

The use of PAC as a coagulant aid is well known. For instance, in U.S. Pat. No. 3,252,899 to Rice, et. al., the use of activated carbon and a polymeric flocculating agent such as polyacrylamide or hydrolyzed polyacrylamide is stated to remove organic pollutants from wastewater. Of similar import is U.S. Pat. No. 4,043,904 to Takeda, et. al., which teaches the use of polyacrylamide with PAC to cleanse wastewaters contaminated with polynuclear surface active agents.

Other prior art patents and literature references which may be of interest to the present application include: U.S. Pat. No. 4,239,865 (Tarao, et. al.); U.S. Pat. No. 4,320,011 (Sato, et. al.); Chem. Abstract 87:90394e (1977); Chem. Abstract 89:117244m (1978); Chem. Abstract 94:157877e (1981); and Chem. Abstract 89:117260p (1978).

The present invention, as it uses a combination of cationic polymer and PAC is viewed as an improvement in the art since it not only effectively reduces color content but also avoids the heretofore mentioned problems associated with chlorination.

DETAILED DESCRIPTION OF THE INVENTION

In accordance with the invention, treatment comprising PAC and a water soluble or water dispersible cationic polyelectrolyte is utilized to reduce the color contamination content of influent water. These components are preferably admitted to the influent, raw water at a location or locations upstream from a softening, clarification or filtration process.

The first component of the system is powdered activated carbon. This is available commercially from a variety of sources.

The second component is a water soluble or dispersible cationic polyelectrolyte polymer or polymers chosen from the groupings (I), (II) (III) as hereinafter defined.

Polymers belonging to the first (I) grouping include water soluble or dispersible polyquaternary ammonium polymers of the type disclosed in U.S. Pat. No. Re. 28,807 (Panzer, et. al.). The entire disclosure of this reissue patent is hereby incorporated by reference herein.

As is stated in that reissue patent, the polyquaternary polymers of cationic polymer group (I) are derived from reaction of secondary amines, such as dialkylamines, and difunctional epoxide compounds or precursors thereof.

In accordance with the reissue patent disclosure, the water dispersible polyquaternary polymers, used as the second component in the present invention, consist essentially of the repeat units

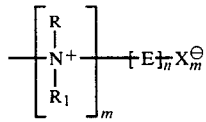

wherein R and $R_1$ are independently selected from the group consisting of lower alkyl (1–3 carbon atoms). E is the residue obtained after bifunctional reaction of a compound selected from the group consisting of epihalohydrins, diepoxides, precursors for epihalohydrins and diepoxides, and mixtures thereof. m and n are integers of substantially equal value. $X^\ominus$ represents the anion forming a portion of the polyquaternary compound. In summary, the polymers (group I) involve only two reactants: a lower dialkylamine, and a difunctional epoxy type reactant.

As to the epoxy reactant, epihalohydrins such as epichlorohydrin and epibromohydrin may be mentioned. Epichlorohydrin is preferred. Diepoxides such as 1,4-butanediol-diglycidyl ethers are also useful. Precursors for epihalohydrins and diepoxides are also useful. Exemplary precursors include: 1,3-dichloropropanol-2 and 1,4-dichloro,2,3-dihydroxybutane.

As to the secondary amines which may be used as reactants, these include dimethylamine, diethylamine, dipropylamine, and secondary amines containing mixtures of alkyl groups having 1 to 3 carbon atoms.

Exact reaction parameters may be gleaned from perusal of aforementioned U.S. Pat. No. Re. 28,807 and need not be repeated here. Suffice it here to say that the preferred polymer of group I is formed from dimethylamine and epichlorohydrin reaction. Such reaction is detailed in Example 1 of the reissue patent.

The preferred polyquaternary polymer of group I is thought to have the structure:

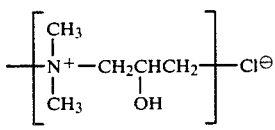

The molecular weight of this polymer is approximately 10,000. The particular molecular weight is not critical as long as the polymer remains water soluble or water dispersible.

As to the group (II) cationic polymers which may be used in accordance with the invention, these may be generically characterized as cross-linked polyquaternary ammonium polymers and are described in detail in U.S. Pat. No. Re. 28,808 (Panzer, et. al.). The entire disclosure of this reissue patent is hereby incorporated by reference herein.

As is stated in U.S. Pat. No. Re. 28,808, the water dispersible polyquaternary polymer consists essentially of repeating units.

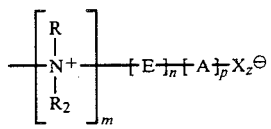

wherein $R$, $R_2$, $E$, $m$, and $n$ are the same as given above for the polymer (I) grouping.

A is the residue obtained after bifunctional reaction of a polyfunctional polyamine selected from the group consisting of ammonia, primary amines, alkylene diamines of 2 to 6 carbon atoms, polyalkylpolyamines of the structure

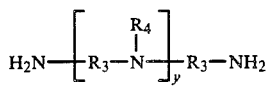

wherein $y$ represents an integer of about 1 to 5, $R_3$ is an alkylene radical of about 2 to 6 carbon atoms, and $R_4$ is selected from the group consisting of hydrogen, alkyl of about 1 to 3 carbon atoms, and $\omega$-aminoalkyls of about 2 to 6 carbon atoms, a polyglycolamine of a structure such as

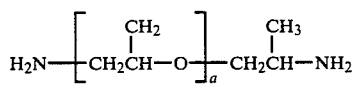

wherein $a$ is an integer of about 1 to 5, piperazine heteroaromatic diamines of the structure

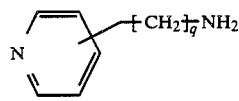

wherein $q$ is zero or an integer of about 1 to 3, aromatic diamines of the structure

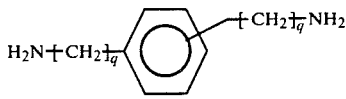

wherein $q$ is zero or an integer of about 1 to 3, and polyaminepolybasic acid condensation products of molecular weight up to about 10,000; $X^{\ominus}$ is an ion forming the anionic portion of said polyquaternary compound; $m$ and $p$ are integers which represent molar quantities of amine reactants, the ratio of $m$ to $p$ being from about 99:1 to 85:15; $n$ represents the molar quantity of E forming the principal chain of said polyquaternary, the molar quantity represented by $n$ being substantially equal to the sum of the molar quantities of $m$ and $p$; said polyfunctional amine containing in addition to the amount of E required for difunctional reaction therewith an amount of E which is from zero to about the full functional equivalency remaining in said A; the sum of $m$, $n$ and $p$ being such as to provide a polyquaternary compound which as a 37% aqueous solution, by weight, based on the total weight of the cationic portion of said polyquaternary has a viscosity at 25° C. of at least = 100 centistokes and Z is an integer such as to satisfy anion requirements of the polyquaternary compound.

In summary, the group II polymers are formed from three reactants: a lower dialkylamine ($C_1$–$C_3$), a difunctional epoxy type reactant (the same as in the Group I polymers) and a third reactant selected from the group consisting of ammonia, primary amines, alkylenediamines of from 2-6 carbon atoms, and polyamines as defined hereinabove for A.

Exact reaction parameters for the group II cationic polyelectrolytes are specified in aforementioned U.S. Pat. No. Re. 28,808 and need not be repeated here. The preferred group II polymer is a cross-linked polyquaternary polymer formed from ethylenediamine, dimethylamine and epichlorohydrin (see for instance Example 2 of U.S. Pat. No. Re. 28,808).

The preferred group II polymer is thought to have the structure:

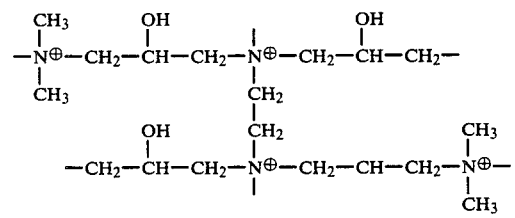

The molecular weight $\overline{M}n$ of this polymer is $400$–$600 \times 10^3$.

Cationic polymers of Group III are disclosed in U.S. Pat. No. 3,288,770 (Butler). The entire disclosure of U.S. Pat. No. 3,288,770 is hereby incorporated by reference herein.

To paraphrase U.S. Pat. No. 3,288,770, these particular high molecular weight polyquaternary polymers are characterized as having a linear homopolymer chain of repeat units having one of the formulae:

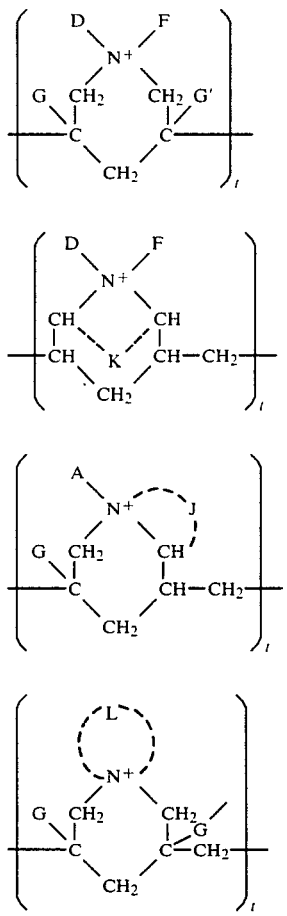

It will be appreciated that, with each such cationic ammonium group, there is associated a chloride anion.

In the above formulae, the symbols D and F independently represent an alkyl, hydroxyalkyl, or phenyl radical which may contain as substituents such groupings as amido, carboloweralkoxy, loweralkoxy, mono- and dicyclic aryloxy, cyano, thioloweralkoxy, thiophenoxy, or lower alkoyl (forming a ketonic group) radicals, 5- and 6-membered cycloalkyl groupings, and, on the alkyl groupings only, a nitro group, and on the phenyl radical only, a halogen atom (chlorine, bromine, fluorine, and iodine).

The symbols G and G' independently represent a hydrogen, chloro, bromo, or lower alkyl or phenyl radical, having substituents as stated under the definition for D and F above.

The symbol K stands for a divalent radical of the formula:

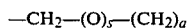

—CH$_2$—(O)$_s$—(CH$_2$)$_u$

The symbol J stands for a divalent radical of the formula:

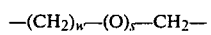

—(CH$_2$)$_w$—(O)$_s$—CH$_2$—

The symbol L stands for a divalent radical of the formula:

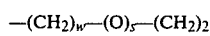

—(CH$_2$)$_w$—(O)$_s$—(CH$_2$)$_2$

In these last-mentioned formulae, the small letter s represents one of the numbers 0 and 1; the small letter u represents one of the numbers 1 and 2; and the small letter w represents one of the numbers 2 and 3. See Col. 2 & 3 U.S. Pat. No. 3,288,770.

After the issuance of U.S. Pat. No. 3,288,770, the following formula has been reported as being characteristic of the preferred polymer of group III, namely polydiallyldimethyl ammonium chloride (DADMAC):

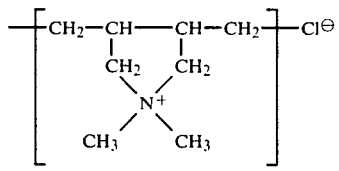

This preferred polymer of Group III has been reported to have a molecular weight (Mn) of between about $250-400 \times 10^3$. It is noted that the molecular weight of this third component (as well as for the polymers of groups I and II) is not critical as long as the polymer remains water soluble or water dispersible.

Methods for producing the polymers of the Group III grouping of the invention need not be reported in detail herein, as they are reported in the aforementioned U.S. Pat. No. 3,288,770. The preferred DADMAC polymer of Group III, for instance, may be prepared in accordance with the disclosure of Example 1 of said U.S. Pat. No. 3,288,770.

The amounts of the treatment components to be fed to the system will vary in accordance with such factors such as: amount of color contamination present in the influent water, water pH, and temperature.

The following treatment ranges, given in terms of ppm (based upon one million parts water) are contemplated:

Component One—P.A.C.—1 ppm to 5,000 ppm, with a range of 5 ppm–200 ppm being preferred;

Component Two—a water soluble or dispersible cationic polyelectrolyte chosen from the above groupings (I) (II) or (III)—based upon 100% actives polymer—0.1–2,500 ppm. It is noted that mixtures of polymers from the groupings (I) (II) and (III) are also within the purview of the invention. A range of from about 1–1,250 ppm of the cationic polymer is preferred.

Compositions in accordance with the invention comprise a slurry of P.A.C. and cationic polymer. If necessary, stabilizing agents such as polysaccharides, etc., may be used to enhance the flow characteristics of the slurry.

Contemplated weight ratios of the slurry components may vary as follows: (parts by weight)

P.A.C.—1 part

Cationic Polymer—0.1–10

At present, the composition preferred for use is (based upon one part by weight P.A.C.)

Component 1—Powdered Activated Carbon—1 part

Component 2—Condensation Polymer of dimethylamine and epichlorohydrin; structure:

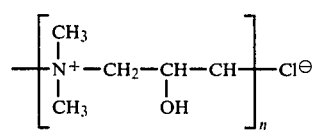

$\overline{M}n \approx 8,000–14,000$ present in an amount of about 0.225 parts based upon 1 part P.A.C.; a group I polymer, and a group III polymer comprising—polydiallyldimethyl ammonium chloride, structure

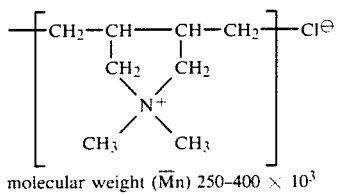

molecular weight ($\overline{M}n$) 250–400 × 10³ present in an amount of about 0.075 parts based upon 1 part of P.A.C.

EXAMPLES

In order to demonstrate the efficacy of the invention in reducing color content of treated water, color reduction tests were undertaken with Florida well water samples. The procedure used was a basic jar test in which the beakers were mixed simultaneously by a gang stirrer. Color determinations were made using a Hach Spectrophotometer. Results appear below in the following tables.

Procedure:

(1) 200 ml of Florida well water added to a 400 ml beaker;

(2) each filled beaker is mixed at 100 rpm using a stirrer equipped with a 1" by 2" paddle;

(3) treatment added at dosage indicated hereinbelow;

(4) treated water samples mixed 30 minutes at 100 rpm;

(5) mixing stopped. Samples allowed to settle for 10 minutes;

(6) supernatant water from each beaker sampled for analysis.

TABLE 1

Test Water: Florida Well Water  pH = 7.0
Turbidity = 2.0 ntu  True Color = 80 color units

| Treatment Added | Treatment Dosages 100% Actives Basis | | Supernatant True Color (color units) |
|---|---|---|---|
| | Polymer "A" (ppm) | PAC (ppm) | |
| None | — | — | 70 |
| Polymer "A"/PAC Blend | 6 | 50 | 9 |
| Polymer "A" | 6 | — | 15 |
| P.A.C. | — | 50 | 66 |

Polymer "A" = condensation polymer of dimethylamine and epichlorohydrin, $\overline{mw} \approx 10,000$, structure

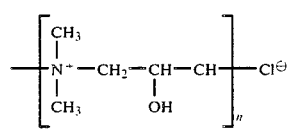

group I polymer

TABLE 2

Test Water:
Florida Well Water  pH = 7.0
Turbidity = 2.0 ntu  True Color = 80 color units Treatment Dosages

| Treatment Added | 100% Actives Basis | | Supernatant True Color (color units) |
|---|---|---|---|
| | Polymer "B" (ppm) | PAC (ppm) | |
| None | — | — | 70 |
| Polymer "B"/PAC Blend | 3 | 50 | 16 |
| Polymer "B" | 3 | — | 23 |
| P.A.C. | — | 50 | 66 |

Polymer "B" = DADMAC polymer a group III polymer; molecular weight 250–400 × 10³ ($\overline{M}n$)

TABLE 3

Test Water:
Florida Well Water  pH = 7.0
Turbidity = 2.0 ntu  True Color = 80 color units

| Treatment Added | Treatment Dosages 100% Actives Basis | | | Supernatant True Color (color units) |
|---|---|---|---|---|
| | Polymer A (ppm) | Polymer B (ppm) | PAC (ppm) | |
| None | — | — | — | 70 |
| Polymer "A"/Polymer "B"/PAC Blend | 4.5 | 0.75 | 50 | 16 |
| Polymer "A"/Polymer "B" | 4.5 | 0.75 | — | 23 |
| P.A.C. | — | — | 50 | 66 |

Polymer "A" = same as Table 1
Polymer "B" = same as Table 2

TABLE 4

Test Water:
Florida Well Water  pH = 8.2
Turbidity = 1.0 ntu  True Color = 53 color units

| Treatment Added | Treatment Dosages 100% Actives Basis | | Supernatant True Color (color units) |
|---|---|---|---|
| | Polymer "C" (ppm) | PAC (ppm) | |
| None | — | — | 49 |
| Polymer "C"/PAC Blend | 7.5 | 50 | 15.5 |
| Polymer "C" | 7.5 | — | 19.0 |
| P.A.C. | — | 50 | 37.5 |

Polymer "C" = polymer of Group II; cross-linked polyquaternary polymer formed from ethylenediamine, dimethylamine, and epichlorohydrin, molecular weight $\overline{M}n \approx 400–600 \times 10^3$ In accordance with the patent statutes, the best mode of practicing the invention has been herein set forth. However, it will be apparent to those skilled in the art that many modifications can be made in the methods and compositions herein disclosed without departing from the spirit of the invention. It is to be understood that the scope of the invention is to be limited solely by the scope of the appended claims:

I claim:

1. Method for reducing the color contaminant content of potable influent water, wherein said color contaminant content comprises a member or members selected from the group consisting of humic acids, lignins, tannins, and fulvic acids, comprising adding to said water (a) from about 1–5,000 ppm of powdered activated carbon (b) from about 1–2,500 ppm of a water soluble or water dispersible cationic polymer selected from the group consisting of (i) polyquaternary ammonium polymers formed from the reaction of dimethylamine and epichlorohydrin and having a molecular weight Mn of about 8,000–14,000 and (ii) cross-linked polyquaternary ammonium polymers formed from reaction of ethylenediamine, dimethylamine, and epichlorohydrin, and having a molecular weight Mn of about $400-600 \times 10^3$ or mixtures of (i) and (ii), mixing said influent water with said activated carbon and said cationic polymer to form a mixture, and separating said mixture to form a supernatant having a reduced color content.

2. Method as recited in claim 1 wherein said polymer (i) has a molecular weight $\overline{M}n$ of about 10,000.

3. Method as recited in claim 1 further comprising adding to said water a second cationic polymer comprising polydiallyldimethyl ammonium chloride having a molecular weight $\overline{M}n$ of about $250-400 \times 10^3$.

4. In a method of treating potable influent water to reduce organic color contamination thereof, wherein said color contamination comprises a member or members selected from the group consisting of humic acids, lignins, tannins, and fulvic acids, and wherein said water is caused to travel from an upstream direction to a downstream direction and is subjected to softening, clarification or filtration processes, the improvement comprising adding to said water, at a location or locations upstream from said softening, clarification or filtration processes, from about 1 to about 5,000 ppm of powdered activated carbon and from about 1-2,500 ppm of a water soluble or water dispersible cationic polymer, selected from the group consisting of (i) polyquaternary ammonium polymers formed from reaction of dimethylamine and epichlorohydrin and having a molecular weight Mn of about 8,000-14,000 and (ii) cross-linked polyquaternary ammonium polymers formed from reaction of ethylenediamine, dimethylamine, and epichlorohydrin, and having a molecular weight Mn of about $400-600 \times 10^3$ or mixtures of (i) and (ii), mixing said influent water with said activated carbon and said cationic polymer to form a mixture, and separating said mixture to form a supernatant having a reduced color content.

5. Method as recited in claim 4 wherein said polymer (i) has a molecular weight $\overline{M}n$ of about 10,000.

6. Method as recited in claim 4 further comprising adding to said water a second cationic polymer comprising polydiallyldimethyl ammonium chloride having a molecular weight $\overline{M}n$ of about $250-400 \times 10^3$.

* * * * *